(12) United States Patent
Chen (10) Patent No.: US 6,249,617 B1
(45) Date of Patent: Jun. 19, 2001

(54) VIDEO ENCOUNTER HAVING AN INTEGRATED SCALING MECHANISM

(75) Inventor: Chien-Liang Chen, Chang-Hua (TW)

(73) Assignee: Winbond Electronics, Corp., Hsinchu (TW)

( * ) Notice: Subject to any disclaimer, the term of this patent is extended or adjusted under 35 U.S.C. 154(b) by 0 days.

(21) Appl. No.: 09/193,175

(22) Filed: Nov. 16, 1998

(51) Int. Cl.[7] ........................................................ G06K 9/32
(52) U.S. Cl. .................................. 382/298; 382/232
(58) Field of Search .................................... 382/298, 232, 382/236, 239; 358/451, 426, 433; 348/403, 404

(56) References Cited

U.S. PATENT DOCUMENTS

| | | | |
|---|---|---|---|
| 5,737,023 | * | 4/1998 | Linzer ................................. 348/416 |
| 5,742,892 | * | 4/1998 | Chaddha ................................ 455/5.1 |
| 5,861,864 | * | 1/1999 | Jensen ................................. 345/115 |
| 5,874,937 | * | 2/1999 | Kesatoshi ............................. 345/127 |
| 6,061,094 | * | 5/2000 | Maietta ................................ 348/446 |
| 6,118,820 | * | 9/2000 | Reitmeier et al. .................... 348/396 |

* cited by examiner

Primary Examiner—Yon J. Couso
(74) Attorney, Agent, or Firm—Raymond Sun (57) ABSTRACT

A video encoder is provided with an integrated scaling mechanism. The scaling mechanism includes a buffer having a plurality of cells arranged in rows and columns. A row-decoder is provided for receiving a portion of an address and selects a row based on the received portion of address. A column-decoder is provided for receiving a portion of the address and selects a column based on the received portion of address. The row-decoder and column-decoder are provided for specifying one cell in the buffer. A multiplexer is interposed between the row decoder and each row for inserting rows into the buffer to upscale the image. These multiplexers are utilized to selectively perform one of (1) enabling a current row, or (2) simultaneously enabling a current row and a next row, based on an up-insert signal. When the current and next rows are enabled, a same data value can be written simultaneously to the current row and the next row. An accumulator is provided for selectively asserting the up-insert signal.

14 Claims, 9 Drawing Sheets

VIDEO ENCOUNTER HAVING AN INTEGRATED SCALING MECHANISM

BACKGROUND OF THE INVENTION

1. Field of the Invention

The present invention relates generally to video coding, and in particular, to a video encoder having an integrated scaling mechanism.

2. Background Art

Generally, there are two types of compression: (1) moving picture compression (also known as motion estimation), and (2) still image compression. Some commonly used standards for moving picture compression include MPEG-I, MPEG-II, H.261, etc. The dominant standard for still image compression is the JPEG standard. Both moving picture compression and still image compression utilize discrete cosine transform (DCT) and variable length encoding (VLE) to compress data (i.e., eliminate the spatially redundant data and de-compress the data).

The moving picture compression utilizes temporal data to compress the data further. Specifically, moving picture compression employs motion estimation techniques that refer to data in previous and/or future frames, also known as B (bidirectional) and P (previous) frames, in an image. The basic scheme is to predict motion from frame to frame in the temporal direction, and then to use DCTs to organize the redundancy in the spatial directions.

In contrast, still image compression utilizes the current frame without considering a previous frame. In other words, still image compression only utilizes an I-frame (intra-frame) without referring to the B and P frames. Additional information regarding the JPEG Still Picture Compression Standard is provided in a paper entitled "The JPEG Still Picture Compression Standard", by Gregory Wallace of Digital Equipment Corp., submitted in December 1991 for publication in IEEE Transactions on Consumer Electronics (a copy is attached herewith).

Up-scaling of an image is important in still image compression and not in moving picture compression because data related to moving picture compression in a DCT buffer is a residue of the motion estimation data and cannot be scaled up.

Figure 1:
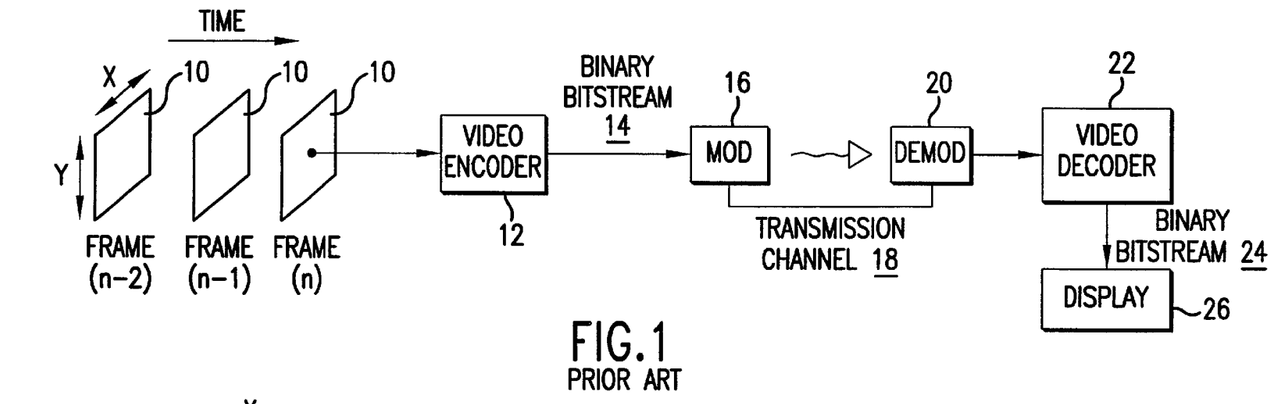
FIG. 1 illustrates the general structural blocks that are used for, and the steps involved in, the conventional digital coding of a sequence of video images.

FIG. 1 illustrates the general structural blocks that are used for, and the steps involved in, the conventional digital coding of a sequence of video images. In particular, the video image is made up of a sequence of video frames 10 that are captured, such as by a digital camera, and transmitted to a video encoder 12. The video encoder 12 receives the digital data on a frame-by-frame and macroblock-by-macroblock basis, and applies a video encoding algorithm to compress the video data. In some applications, the video encoding algorithm can also be implemented in hardware. The video encoder 12 generates an output which consists of a binary bit stream 14 that is processed by a modulator 16. The modulator 16 modulates the binary bit stream 14 and provides the appropriate error protection. The modulated binary bit stream 14 is then transmitted over an appropriate transmission channel 18, such as through a wireless connection (e.g., radio frequency), a wired connection, or via the Internet. The transmission can be done in an analog format (e.g., over phone lines or via satellite) or in a digital format (e.g., via ISDN or cable). The transmitted binary bit stream 14 is then demodulated by a demodulator 20 and provided to a video decoder 22. The video decoder 22 takes the demodulated binary bit stream 24 and converts or decodes it into sequential video frames. These video frames are then provided to a display 26, such as a television screen or monitor, where they can be viewed. If the transmission channel 18 utilizes an analog format, a digital-to-analog converter is provided at the modulator 16 to convert the digital video data to analog form for transmission, and an analog-to-digital converter is provided at the demodulator 20 to convert the analog signals back into digital form for decoding and display.

The video encoding can be embodied in a variety of ways. For example, the actual scene or image can be captured by a camera and provided to a chipset for video encoding. This chipset could take the form of an add-on card that is added to a personal computer (PC). As another example, the camera can include an on-board chip that performs the video encoding. This on-board chip could take the form of an add-on card that is added to a PC, or as a separate stand-alone video phone. As yet another example, the camera could be provided on a PC and the images provided directly to the processor on the PC which performs the video encoding.

Similarly, the video decoder 22 can be embodied in the form of a chip that is incorporated either into a PC or into a video box that is connected to a display unit, such as a monitor or television set.

Each digital video frame 10 is made up of x columns and y rows of pixels (also known as "pels"). In a typical frame 10 (see FIG. 2), there could be 720 columns and 640 rows of pels. Since each pel contains 8 bits of data (for luminance data), each frame 10 could have over three million bits of data (for luminance data). If we include chrominance data, each pel has up to 24 bits of data, so that this number is even greater. This large quantity of data is unsuitable for data storage or transmission because most applications have limited storage (i.e., memory) or limited channel bandwidth. To respond to the large quantity of data that has to be stored or transmitted, techniques have been provided for compressing the data from one frame 10 or a sequence of frames 10 to provide an output that contains a minimal amount of data. This process of compressing large amounts of data from successive video frames is called video compression, and is performed in the video encoder 12.

Figure 2:
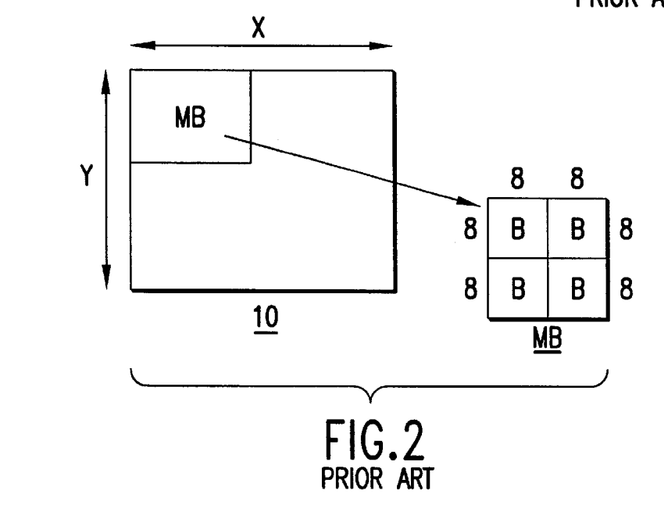
FIG. 2 is a simplified illustration of one frame of video data, and the macroblocks and blocks that make up this frame.

During conventional video encoding, the video encoder 12 will take each frame 10 and divide it into blocks. In particular, each frame 10 can be first divided into macroblocks MB, as shown in FIG. 2. Each of these macroblocks MB can have, for example, 16 rows and 16 columns of pels. Each macroblock MB can be further divided into four blocks B, each block having 8 rows and 8 columns of pels. Once each frame 10 has been divided into blocks B, the video encoder 12 is ready to compress the data in the frame 10.

Figure 3:
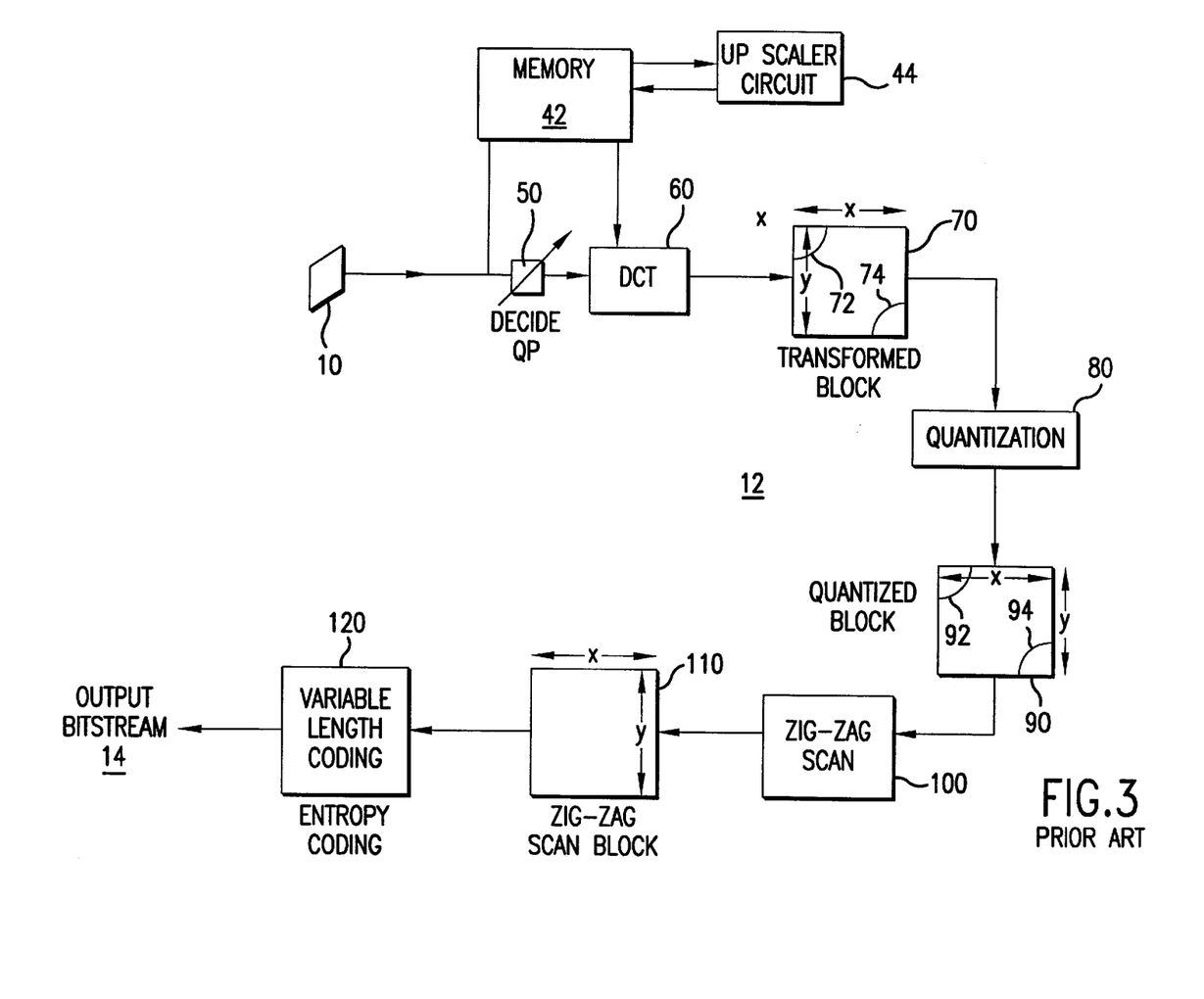
FIG. 3 illustrates the different steps, and the hardware components, that are used by the video encoder of FIG. 1 to carry out conventional video compression.

FIG. 3 illustrates the different steps, and the possible hardware components, that are used by the conventional video encoder 12 to carry out the video compression. Since each frame 10 contains a plurality of blocks B, the following steps will process each frame 10 on a block-by-block basis.

Figure 5:
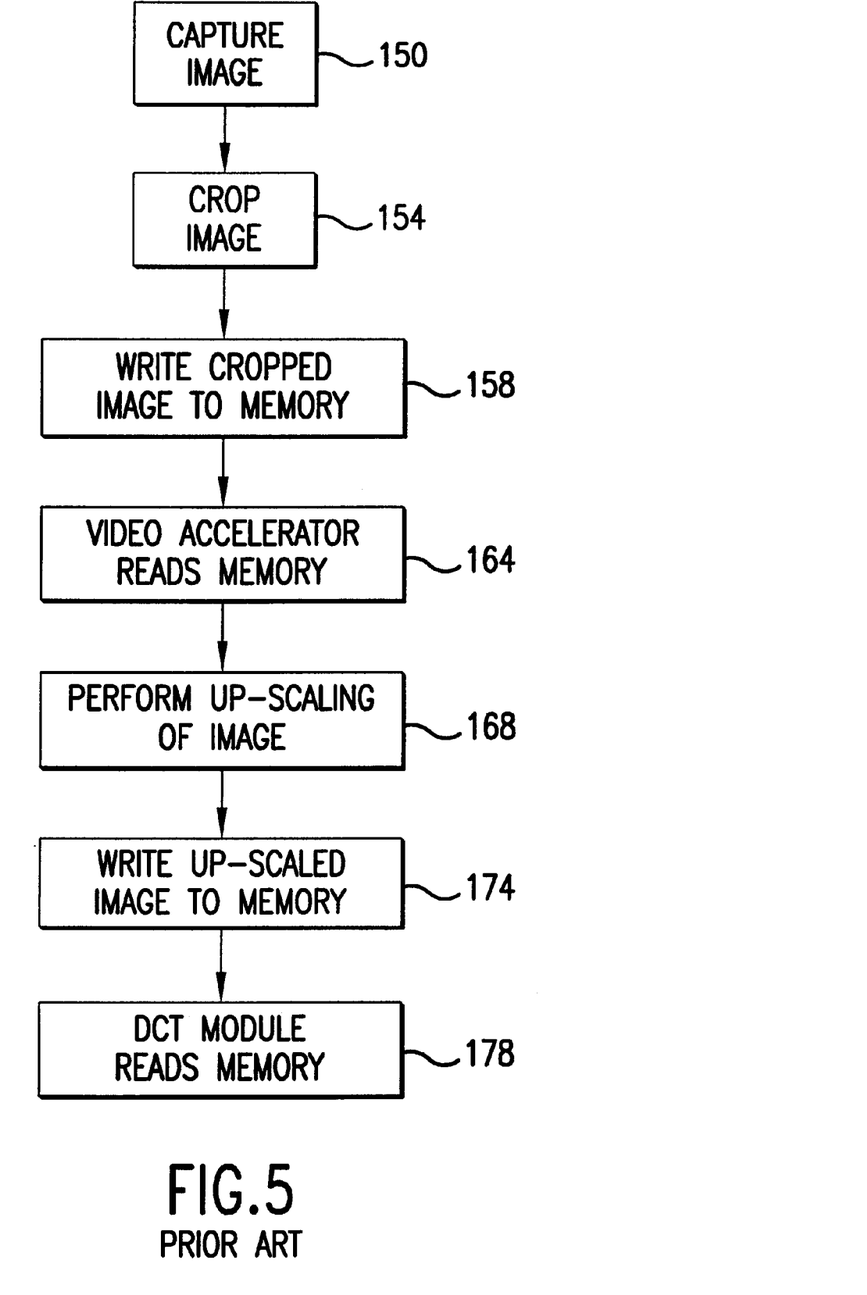
FIG. 5 illustrates the steps performed by a prior art video compression system.

Each block B from each frame 10 is provided to a memory 42 that is provided to store the unscaled image. A separate upscaler circuit 44 reads the unscaled image from memory 42, scales the image, and writes the scaled image back to memory 42. As will be described later, a DCT block 60 reads the scaled image for further processing. FIG. 5, which is described further hereinafter, describes more fully the interaction of memory 42, upscaler 44, and DCT 60.

Each block B from each frame 10 is also provided to a QP decision engine 50 which determines a QP or quantization step size number for the block or groups of blocks. This QP number is determined by a rate control mechanism which divides a fixed bit budget of a frame among different blocks, and is used by the quantization engine 80 to carry out quantization as described below.

Each block B is now provided to a DCT engine 60. DCT of individual blocks helps in removing the spatial redundancy by bringing down the most relevant information into the lower most coefficients in the DCT domain. DCT can be accomplished by carrying out a Fourier-like transformation of the values in each block B. DCT produces a transformed block 70 in which the zeros and lower values are placed in the top left corner 72 of the transformed block 70, and the higher frequency values are placed in the bottom right corner 74.

After having obtained a block 70 of DCT coefficients which contain the energy of the displaced blocks, quantization of these blocks 70 is performed by quantization engine 80. Quantization is a uniform quantization with a step size (i.e., the predetermined QP) varying within a certain range, such as from 2 to 62. It is implemented as a division, or as a table look-up operation for a fixed-point implementation, of each value in the transformed block 70. For example, the quantization level for each value in the block 70 can be determined by dividing the value by 2QP. Therefore, if QP is 10 and a value in the block is 100, then the quantization level for this level is equal to 100 divided by 2QP, or 5. At the video decoder 22 in FIG. 1, the value is reconstructed by multiplying the quantization level (i.e., 5) by 2QP to obtain the original value of 100. Thus, quantization takes a finite set of values and maps the set of values, providing a quantized block 90 where the top left corner 92 contains higher quantized levels, and the bottom right corner 94 contains mostly zeros.

Figure 4:
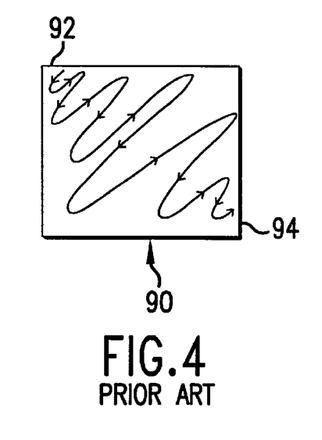
FIG. 4 is a simplified illustration of how a quantized block of data is scanned in a zig-zag manner.

Next, the quantized block 90 is provided to a zig-zag scan engine 100 which performs a zig-zag scan of the values in the block 90. The direction of the scan is illustrated in FIG. 4, and begins from the top left corner 92, which contains the higher quantized levels, through the middle of the block 90 and to the bottom right corner 94, which contains mostly zeros. The zig-zag scan produces a zig-zag scan block 110 in which the quantized values from the quantized block 90 are positioned linearly across the zig-zag scan block 110. Therefore, zig-zag scan emulates going from a lower to a higher frequency, thereby resulting in long runs of zeros in the zig-zag scan block 110.

The values in the zig-zag scan block 110 are then provided to a variable length coding engine 120 where entropy coding is performed. Traditionally, most video coding standards use Huffman coding for entropy coding. The JPEG standard can use either Huffman coding or arithmetic coding. First, a non-zero value followed by runs of zeros is encoded as a single "event". For example, "400000000000" and "10000000000000" would each be encoded as separate single events. Entropy coding is then performed on these events to generate a unique binary code for each event. These binary codes are output as the binary bitstream 14 described above. These unique binary codes can be recognized by the video decoder 22 and decoded by the video decoder 22 into the original values (i.e., non-zero values followed by runs of zeros).

Thus, the conventional video encoder 12 and its operation, as illustrated in FIG. 3, function to minimize (i.e., compress) the large number of bits at the input blocks B of each frame 10 (see FIG. 2) to a minimal number of bits at the bitstream 14, taking advantage of the fact that the DCT and quantization steps will produce multiple runs of zeros. The transmitted bitstream 14 is decoded by the video decoder 22 by reversing the steps performed by the video encoder 12.

Up-scaling is an important and needed operation since the format of an image captured by an image capture device in many cases is different from the format expected by a compression scheme utilized by the video compressor. For example, an image format commonly utilized by input devices, such as charge-coupled device (CCD) or complimentary metal oxide semiconductor (CMOS) based video cameras and video-cassette recorders (VCR), is the National Television Standards Committee (NTSC) format. A video frame in the NTSC format can be in a non-interlace display mode or a progressive display mode. The frame can have a size of 720×480. In an interlace display mode, an even field having the even lines of the frame and an odd field having odd lines of the frame are provided. The even field and the odd field can each have a size of 720×240.

In contrast, a common intermediate format (CIF) compression scheme expects an image to have a format with a size of 352×288. Accordingly, in an interlace mode, the odd field and even field both need to be up-scaled (in the y-direction) so that the height of the field is increased from 240 to 288. In other instances, depending on the format of the image as captured by the image capture device and the format expected by a particular compression algorithm, the input image may need to be up-scaled in the x-direction (i.e., the width of the image may need to be increased).

FIG. 5 illustrates a conventional approach to format the size of a captured image to a format suitable for a particular compression scheme. In step 150, an image is captured via an input device, such as a charge-coupled device (CCD) or complementary metal oxide semiconductor (CMOS) based video camera. In step 154, a cropping or down-scaling operation is performed on the captured image. In step 158, the down-scaled image is written into a memory, such as a dynamic random access memory (DRAM). In step 164, a video accelerator reads the down-scaled image from the memory. In step 168, the video accelerator performs an up-scaling operation (e.g., adjusting the height of the image so that it meets the requirements of the compression scheme) on the down-scaled image. In step 174, the up-scaled image is written into the memory. In step 178, a DCT module reads the up-scaled image from the memory.

As is evident from FIG. 5, the conventional approach requires that (1) additional memory be reserved to store the intermediate images; and (2) an access time be allotted to read and write the intermediate images from and to memory.

These additional memory accesses decreases the overall speed of the image processing system. In addition, these additional memory accesses reduce the available bandwidth of the memory bus, and increase the space in memory that needs to be allocated for the intermediate results.

Thus, there still remains a need for a video encoder and up-scaler that reduces the number of memory accesses and increases the available space in memory and the available memory bus bandwidth.

SUMMARY OF THE INVENTION

It is an object of the present invention to provide a video encoder having an integrated scaling mechanism.

It is another object of the present invention to provide a video encoder architecture that reduces the number of memory accesses.

It is a further object of the present invention to provide a video encoder architecture that increases the available space in memory.

It is a yet another object of the present invention to provide a video encoder architecture that increases the available memory bus bandwidth.

In order to accomplish these and other objectives of the present invention, a video encoder having an integrated scaling mechanism is provided. The scaling mechanism includes a buffer having a plurality of cells arranged in rows and columns. A row-decoder is provided for receiving a portion of an address and selects a row based on the received portion of address. A column-decoder is provided for receiving a portion of the address and selects a column based on the received portion of address. The row-decoder and column-decoder are provided for specifying one cell in the buffer. A multiplexer is interposed between the row decoder and each row for inserting rows into the buffer to upscale the image. These multiplexers are utilized to selectively perform one of (1) enabling a current row, or (2) simultaneously enabling a current row and a next row, based on an up-insert signal. When the current and next rows are enabled, a same data value can be simultaneously written to the current row and the next row. An accumulator is provided for selectively asserting the up-insert signal.

DETAILED DESCRIPTION OF THE INVENTION

In the following description, for purposes of explanation and not limitation, specific details are set forth in order to provide a thorough understanding of the present invention. However, it will be apparent to one skilled in the art that the present invention may be practiced in other embodiments that depart from these specific details. In certain instances, detailed descriptions of well-known or conventional data processing techniques, hardware devices and circuits are omitted so as to not obscure the description of the present invention with unnecessary detail.

The video encoding method and apparatus according to the present invention provides a video encoder having an integrated up-scaler. By integrating an upscale mechanism with the video encoder, the image can be directly provided to the video encoder without the intermediate steps described in the Background. Specifically, the present invention obviates the step of writing an up-scaled image from a separate up-scaler to memory and the step of reading the stored up-scaled image from the memory by the compressor, thereby saving memory bandwidth.

Figure 6:
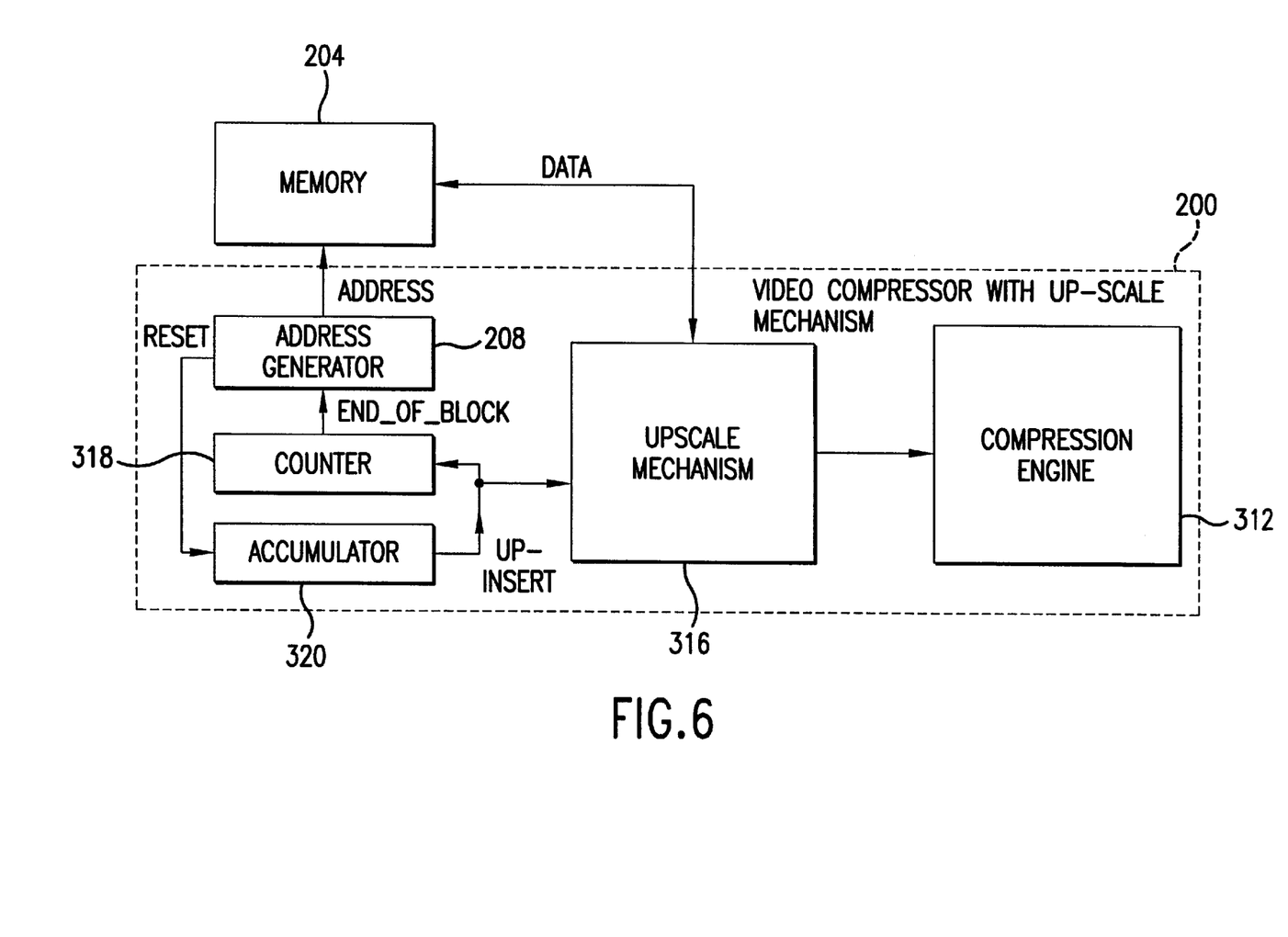
FIG. 6. is a block diagram illustrating a video compressor configured in accordance with one embodiment of the present invention.

FIG. 6. is a block diagram illustrating a video compressor 200 configured in accordance with one embodiment of the present invention. Video compressor 200 can be implemented in DCT block 60 of FIG. 3, thereby making the up-scale circuit 44 unnecessary. Video compressor 200 communicates with a memory 204, such as a dynamic random access memory (DRAM). Video compressor 200 includes an address generator 208 for generating addresses, a compression engine 312 for performing a compression operation on images, and an upscale mechanism 316 for receiving an unscaled image from memory 204 and for adjusting the format of the unscaled image into a format acceptable to compression engine 312.

The address generator 208 provides addresses to memory 204. In response to the addresses, memory 204 provides data at the specified address locations to upscale mechanism 316. Upscale mechanism 316 utilizes the addresses for enabling the data from memory 204 to be selectively written into specific locations of a buffer 340 (described in greater detail hereinafter with reference to FIG. 7).

Figure 8:
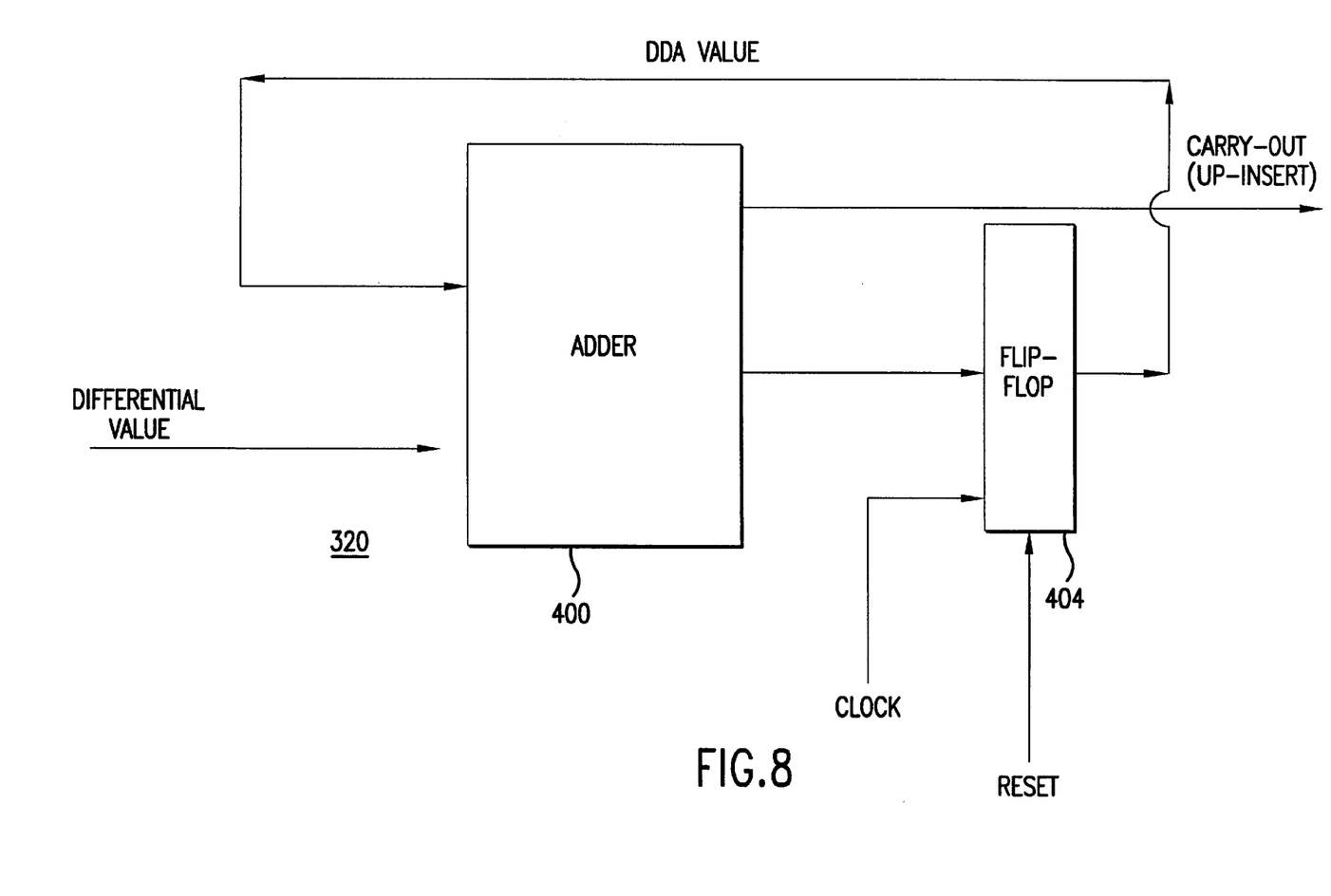
FIG. 8 illustrates in greater detail the accumulator of FIG. 6.

Video compressor 200 also includes an accumulator 320 for selectively providing an "up-insert" signal to the upscale mechanism 316 for inserting a line of data into the buffer 340, and a counter 318 that provides the address generator 208 with an END_OF_BLOCK signal that indicates that all the lines in a block (in the buffer 340) have been filled. An exemplary implementation of accumulator 320 is shown in FIG. 8, and described below.

When compression engine 312 is configured to perform a discrete cosine transform (DCT), the image is first divided into a plurality of 8×8 blocks. Accordingly, address generator 208 generates and provides the corresponding addresses to memory 204 to access a particular block of pixel data. In this embodiment, address generator 208 includes a first counter that is a 21-bit counter for accessing data from memory 204, a second counter (hereinafter referred to as a X counter) that is a 3-bit counter, and a third counter (hereinafter referred to as a Y counter) that is also a 3-bit counter. The X counter and Y counter are utilized to address each pixel in each 8×8 DCT block.

The following is a description of how a pixel is written into the buffer that is described below in FIG. 7. First, the X counter and Y counter are initialized (i.e., set to 0). Second, address generator 208 is utilized to access memory 204 for a desired pixel by generating and providing the address of the desired pixel to memory 204. Third, after accessing the pixel from memory 204, the pixel is written into buffer 340.

The following program further describes the steps performed by address generator 208. In the following program, consider an image having a width of Image_Width and a height of Image_Height.

| ADDRESS GENERATOR PROGRAM |  |
|---|---|
| X=0; | // counter of DCT in X-Dim |
| Y=0; | // counter of DCT in Y-Dim |

```
I, j     // variables to control the loops
Image_Width_in_DCT = Image_Width / 8;
Image_Height_in_DCT Image_Height / 8;
DRAM_ADDR_Y = initial_address_of_image_in_DRAM
for(i=0; i<Image_Height_in_DCT; i=i+1)
                // count the DCT blocks in X-Dim
{
    DRAM_ADDR_X = DRAM_ADDR_Y;
    for(j=0; j<Image_Width_in_DCT; j=j+1)
                // count the DCT blocks in Y-Dim
    {
        DRAM_ADDR_BLK_Y = DRAM_ADDR_X;
        for(Y=0; Y<8; Y=Y+1)
        {
            DRAM_ADDR_BLK_X = DRAM_ADDR_BLK_Y;
            for(X=0; X<8; X=X+1)
            {
                DCT_BUFFER [Y] [X] = DRAM[DRAM_ADDR_BLK_X];
                    // write the pixel data into DCT buffer
                DRAM_ADDR_BLK_X = DRAM_ADDR_BLK_X + 1;
                // get the next pixel in X-dim inside DCT (same row)
            }
            DRAM_ADDR_BLK_Y = DRAM_ADDR_BLK_Y + 1;
                // get the pixel in Y-dim inside DCT (next row)
        }
        DRAM_ADDR_X = DRAM_ADDR_X + 8;
            // get the next DCT initial address in X-dim
    }
    DRAM_ADDR_Y = DRAM_ADDR_Y + 8;
            // get the next DCT initial address in Y-dim
}
```

It is noted that although many applications utilize blocks that have eight (8) lines in the Y direction, the exemplary embodiment can handle Y lines in the Y direction where Y is between 0 and 8. For example, the block can be an 8×4 block where Y is 4. This example is described in greater detail hereinafter with reference to FIG. 11. Accordingly, address generator 208 is configured to handle blocks with Y dimensions between 0 and 8. It is noted that, depending on the application, the Y dimension can be different, and the address generator 208 can be configured to suit the required range of Y values.

Figure 7:
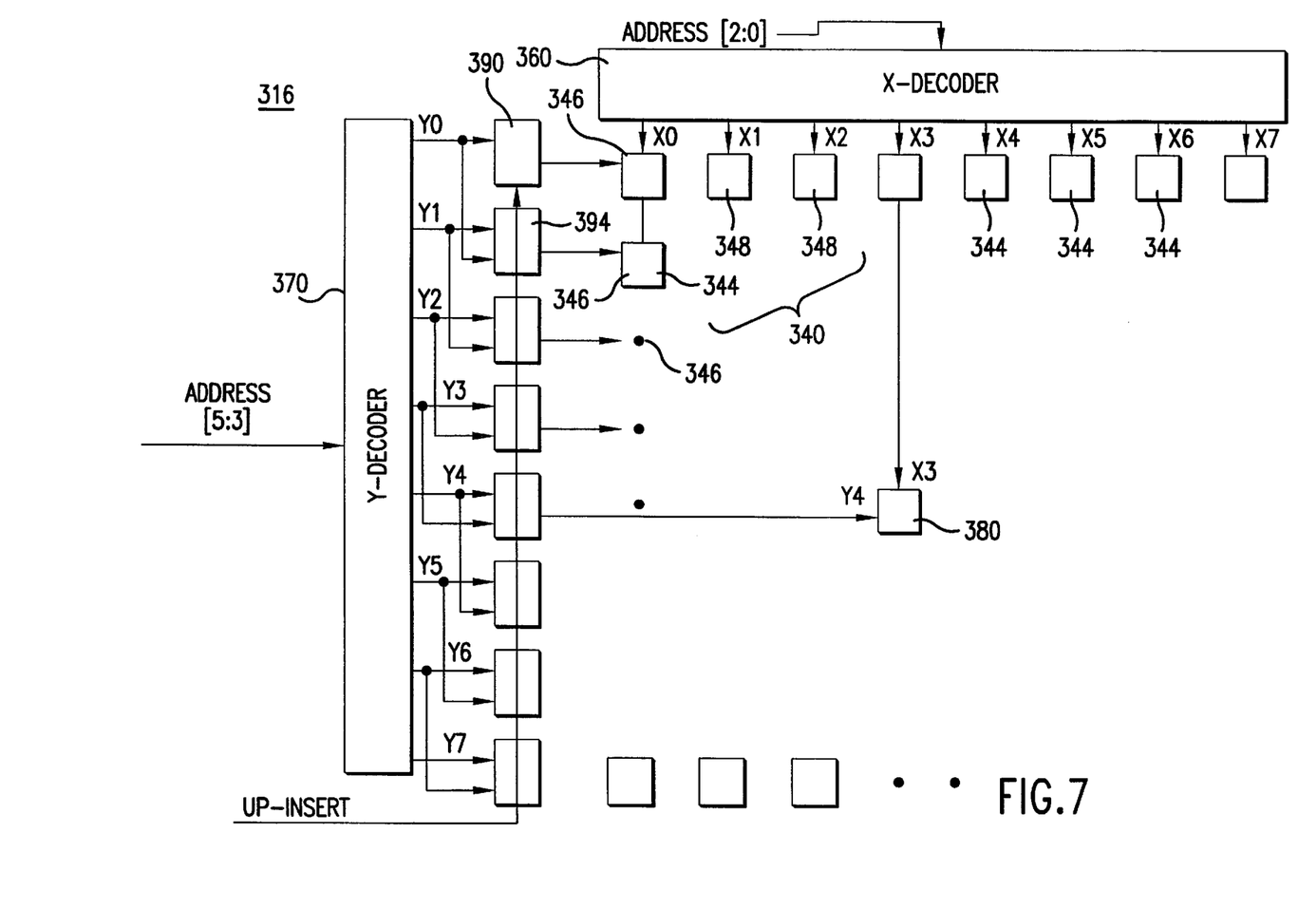
FIG. 7 illustrates in greater detail the upscale mechanism of FIG. 6.

FIG. 7 illustrates in greater detail upscale mechanism 316 of FIG. 6. Upscale mechanism 316 includes a buffer 340 having a plurality of storage locations 344 that can be arranged in rows 346 and columns 348 as shown. Each storage location 344 can store one or more bits that represent a pixel in an image. Upscale mechanism 316 also includes an x-decoder 360 for selecting one of the columns 348 and a y-decoder 370 for selecting one of the rows 346.

X-decoder 360 includes an input for receiving one or more bits of an address provided by address generator 208 and one output corresponding to each column 348 for providing an enable signal to selectively enable one of the columns 348. In this example, there are eight independent and separately controllable enable signals (i.e., X0 . . . X7) that correspond to the eight columns 348, respectively. In this embodiment, x-decoder 360 receives the lower order bits of address (i.e., addr[2:0]).

Y-decoder 370 includes an input for receiving one or more bits of an address provided by address generator 208 and one output corresponding to each row 346 for providing an enable signal to selectively enable one of the rows 346. In this example, there are eight independent and separately controllable enable signals (i.e., Y0 . . . Y7) that correspond to the eight rows 346, respectively. In this embodiment, y-decoder 370 receives the higher order bits of address (i.e., addr[5:3]).

Together, x-decoder 360 and y-decoder 370 can specify one of the storage locations 344 in buffer 340. For example, if the address is 0x100011 (i.e., addr[5:0]=35), row Y4 is enabled, and column X3 is enabled. Accordingly, storage location 380 at (Y4, X3) is enabled or selected.

Upscale mechanism 316 also includes a plurality of multiplexers (e.g., MUX 390 for the first row and MUX 394 for the second row) that are utilized to copy or insert rows. Each multiplexer (MUX[0-7]) corresponds to a particular row. The first multiplexer 390 includes an input for receiving the Y0 enable signal from y-decoder 370, a select input for receiving an up-insert signal from accumulator 320, and an output coupled to the first row. A second multiplexer 394 includes a first input for receiving an enable signal (Y1) for the current row (i.e., the second row) from y-decoder 370, a second input for receiving an enable signal (Y0) from the previous row (i.e., the first row) from y-decoder 370, a select input for receiving an up-insert signal from accumulator 320, and an output coupled to the second row. The subsequent MUXs (i.e., MUX[2-7]) have the same inputs and output as second MUX 394 and their description will not be repeated herein. In general, the up-insert signal is used to selectively enable one or two multiplexers (MUX[0-7]). One multiplexer is enabled if no line insertion is needed, but two consecutive multiplexers are simultaneously enabled if a line is to be inserted, so that the data fetched from memory 204 can be simultaneously written into two consecutive rows.

When the scaling of the height (i.e., the number of rows) of an image is of concern, as in this example, but the scaling of the width (i.e., the number of columns) of the image is not needed, multiplexers are only needed for each row as shown. However, it will be understood by those of ordinary skill in the art that the present invention can be practiced to scale the height of the image, to scale the width of the image or to scale both the height and width of the image. For example, it will be evident that multiplexers can be utilized between x-decoder 360 and the rows 348 to copy columns of data.

FIG. 8 illustrates in greater detail the accumulator 320 of FIG. 6. Accumulator 320 is provided to manage the up-insert signal. Accumulator 320 includes an adder 400 and a flip-flop 404. Adder 400 includes a first input for receiving the differential value, also referred to hereinafter with the label "k" (i.e., the difference between the height of the image and the height acceptable to the compression engine 312), and a second input for receiving the accumulated value (i.e., the DDA value). The differential value "k" is provided by a software driver based on the calculations in the example below. Based on these two inputs, adder 400 performs an addition operation on these two input values and provides an output which represents the sum of the two input values. The operation of accumulator 320 is described in greater detail below.

Adder 400 includes a first output for providing a sum bit and a second output for providing a carry-out bit or up-insert signal. Flip-flop 404 includes a first input for receiving the sum bit from adder 400, a second input for receiving a clock signal, a third input for receiving a reset signal from the address generator 208, and an output for providing the DDA value back to the adder 400 based on the inputs. In this example, adder 400 is a 6 bit adder, and the DDA value is 6 bits wide. It is noted that the number of bits of the DDA value can vary from application to application and depends on the up-scaling precision needed in a particular application. The clock signal can be a system clock signal, and the reset signal can be a Start_of_Frame signal provided by the address generator 208 so that the DDA value is reset for every frame. In one embodiment, accumulator 320 can be a digital differential accumulator (DDA).

Consider an original image has a height of x lines, and an acceptable format that specifies a height of y lines. In one embodiment, accumulator 320 can selectively assert the up-insert signal in accordance with the following steps:

```
k = (y–x);      //where k is the difference between the
                current height x and the desired height y//
DDA = 0;        //initialize accumulation value//
for (i = 0; i ≦ x; 1 = i +1)
{
    DDA = DDA + k
    if (DDA ≧ x)     //carry-out in view of hardware//
    {
        DDA = DDA – x;
        up-insert = 1;   //assert the up-insert signal//
    }
    else
    {
        up-insert = 0;   //de-assert the up-insert signal//
    }
};
```

The following is an example of this method. For this example, the up-scaling is from 2 to 3, so that the differential value k is equal to 1, where y is 3 and x is 2. Following the steps outlined above (where DDA is originally 0):

| Line From Memory 204 | DDA = DDA + k<br>If (DDA ≧ x)<br>DDA = DDA – x | Row In Buffer 340 |
|---|---|---|
| 0 ------> | 0 + 1 = 1 < 2 | 0 |
| 1 ------> | 1 + 1 = 2 ≧ 2 | 1 |
|  | 2 – 2 = 0 | 1 (Insert) |
| 2 ------> | 0 + 1 = 1 < 2 | 2 |
| 3 ------> | 1 + 1 = 2 ≧ 2 | 3 |
|  | 2 – 2 = 0 | 3 (Insert) |
| 4 ------> | 0 + 1 = 1 < 2 | 4 |

The same steps are repeated for lines 5 through 7, so that lines 1, 3, 5 and 7 are copied and inserted.

The counter 318 tracks the number of scan-lines fetched so far to determine whether an entire block of data (i.e., 8 lines) has been fetched. Counter 318 adds one if the up-insert signal is not asserted and adds two if the up-insert signal is asserted. The reason for adding two is that a scan line has been inserted in addition to the one line of data written from memory 204. Thus, the counter 318 is incremented regardless of whether any line insertion is done. For example, if there is no line insertion, then one scan line is fetched from memory 204 and written into buffer 340, and the counter 318 is incremented by 1. If there is a line insertion, then one scan line is fetched from memory 204 and written into two rows of buffer 340 (via the simultaneous enablement of two consecutive multiplexers), and the counter 318 is incremented by 2. When the counter 318 equals or is greater than 7 (if counter 318 counts from zero), it means that an 8×8 block of data input has been completed, and the counter 318 provides an END_OF_BLOCK signal to address generator 208.

Figure 9:
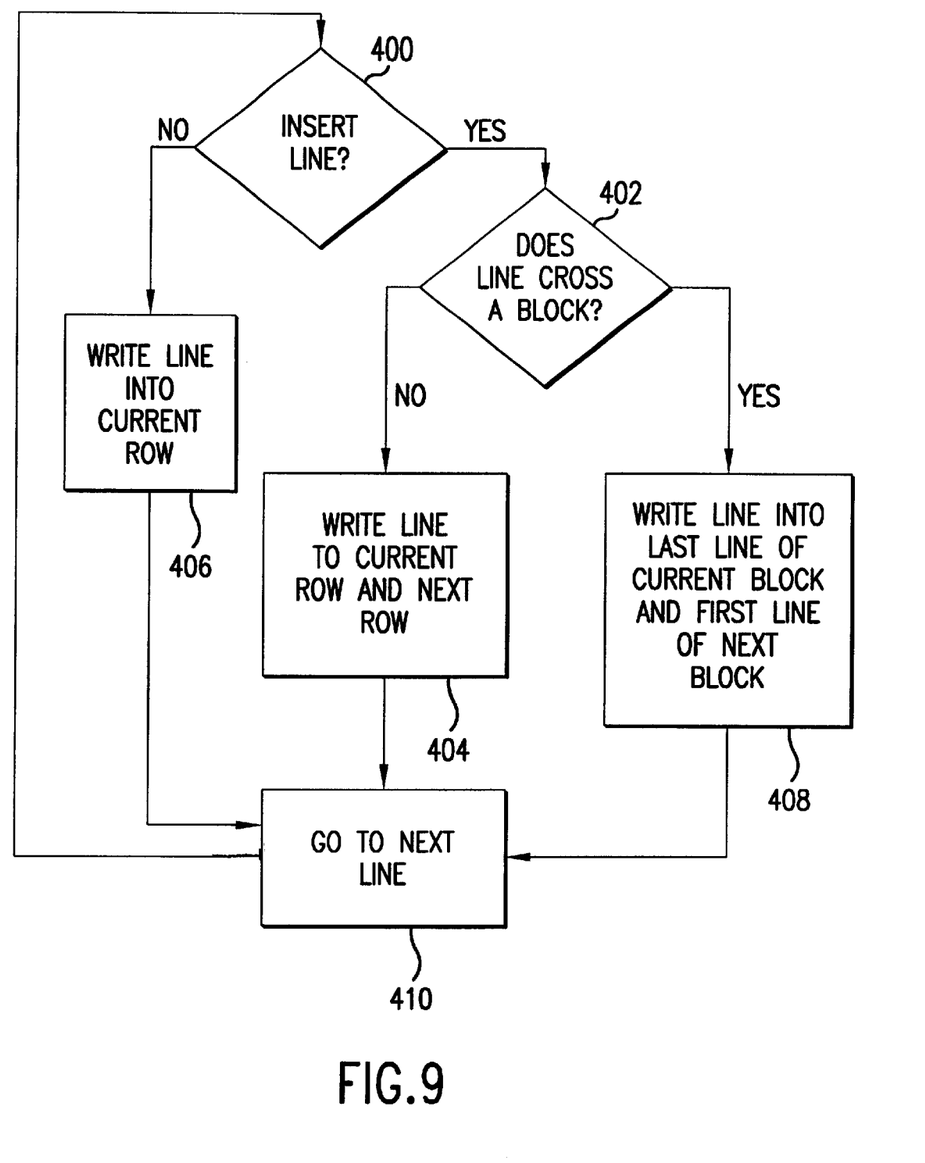
FIG. 9 is a flowchart illustrating the processing steps carried out by the video compressor of FIG. 6.

FIG. 9 is a flowchart illustrating the processing steps carried out by the video compressor of FIG. 6. In step 400, it is determined if a line or row needs to be inserted. The above example illustrates how this determination is made. If a line is not to be inserted, then in step 406, the scan line is fetched from memory 204 and written into the one row in buffer 340, and processing proceeds to step 410.

If a line is to be inserted, then in step 402, it is determined if the line to be inserted crosses a block (i.e., is the current line or row the last row of a block?). If no, in step 404, the current line is fetched and simultaneously written to both the current row and the next row in buffer 340 (i.e., enable the consecutive multiplexers for both a current row and a second row and write the same data simultaneously to the current row and the second row). If the line to be inserted crosses a block, then in step 408, the current line of data from memory 204 is written into the last row of the instant block, and to the first row of the new block of image data (i.e., new 8×8 block). From steps 404 and 408, processing proceeds to steps 410 and 400, where the next line is evaluated to determine whether a line insertion is needed.

The present invention can be implemented into a video encoder that implements a compression algorithm that can include, but is not limited to, common intermediate format (CIF), QCIF, sub-QCIF, 4CIF, or 16CIF. Table I illustrates the width and height of the input expected by the above-listed compression schemes.

TABLE I

| FORMAT | WIDTH | HEIGHT |
|---|---|---|
| sub-QCIF | 128 | 96 |
| QCIF | 176 | 144 |
| CIF | 352 | 288 |
| 4CIF | 704 | 576 |
| 16CIF | 1408 | 1152 |

Figure 10:
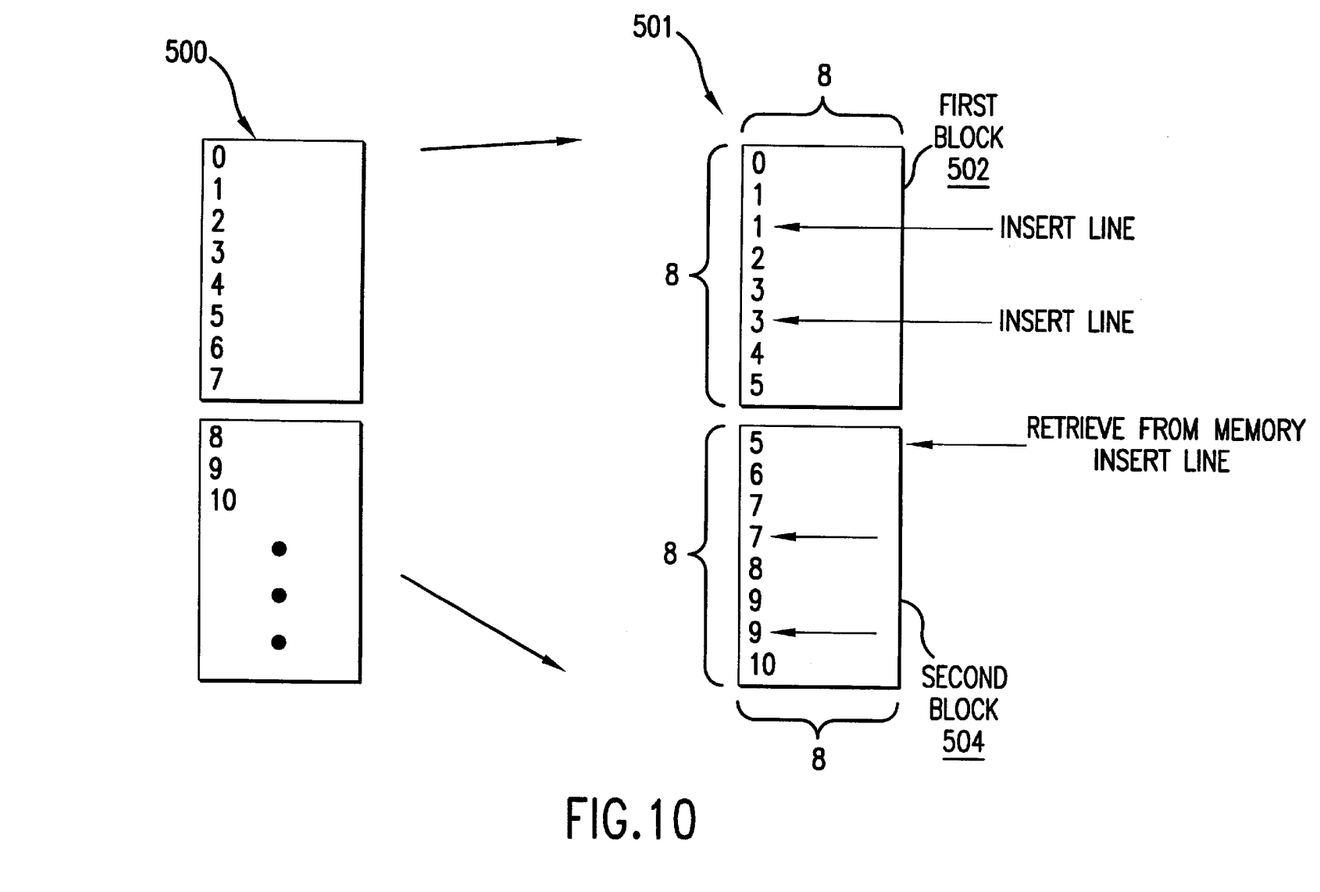
FIG. 10 is an example of inserting lines within a block and across from a first data block to a second data block.

FIG. 10 is an example of inserting lines within a block and across from a first data block to a second data block. An original image 500 is up-scaled into a modified image 501. Image 500 includes a number of lines (e.g., 0, 1, 2, 3, 4, 5, 6, 7, 8, 9, 10, . . . etc.). Modified image 501 includes a first block 502 and a second block 504. In first block 502, line 1 is copied and inserted. Similarly, line 3 is copied and inserted. In second block 504, line 5 is retrieved from memory and inserted as the first line of second block 504. In second block 504, lines 7 and 9 are copied and inserted. Lines 1, 3, 7, and 9 do not need to be retrieved from memory since they can be copied into the block when the first version is read into the buffer.

Figure 11:
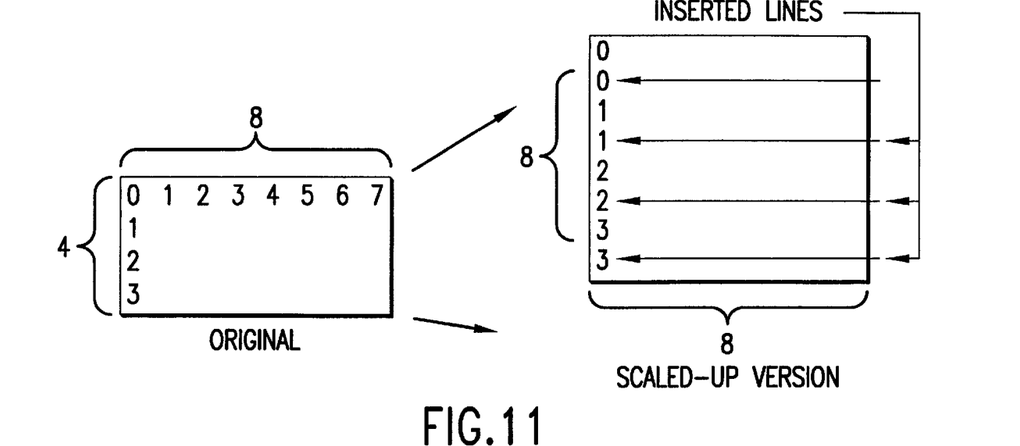
FIG. 11 illustrates how an 8×4 block of an image is up-scaled to an 8×8 block.

FIG. 11 illustrates how an 8×4 block of an image is up-scaled to an 8×8 block. In this case, lines 0, 1, 2, and 3 are copied and inserted to form the 8×8 block.

Figure 12:
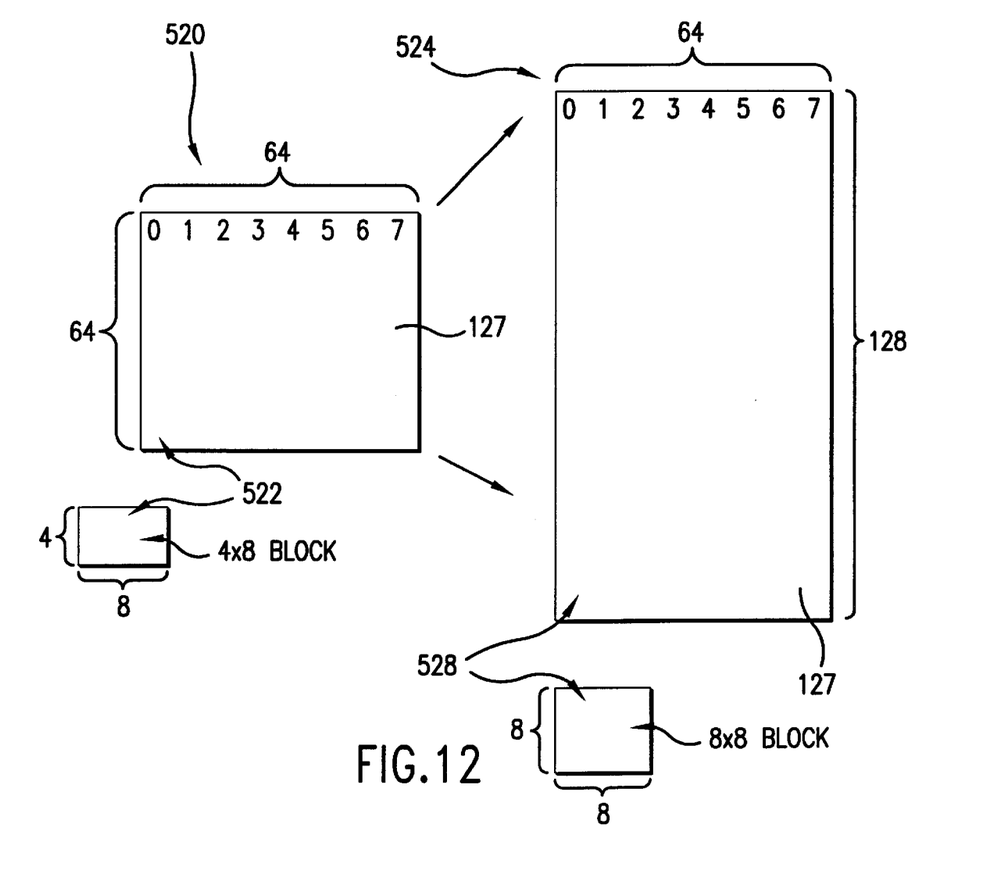
FIG. 12 illustrates how the present invention up-scales a 64×64 image into a 64×128 image.

FIG. 12 illustrates how the present invention up-scales a 64×64 image into a 64×128 image. The original image 520 includes a plurality of blocks 522, arranged in rows and columns, where each block 522 is a 4×8 block. The up-scaled image 524 includes a plurality of blocks 528, arranged in rows and columns, where each block 528 is a 8×8 block. For example, the upscaling shown in FIG. 11 can be utilized to change the 4×8 blocks into 8×8 blocks. The blocks 522 and 524 are identified by a block index (e.g., 0 . . . 127).

Although the present invention has been described and illustrated as being implemented in hardware by employing engines or circuits, it is also possible to implement the present invention in software.

Although certain engines, circuits, components, subsystems, and blocks have been described above as including certain elements, it will be appreciated by those skilled in the art that such disclosures are non-limiting, and that different elements, or combinations thereof, can be provided for such engines, circuits, components, subsystems, and blocks without departing from the spirit and scope of the present invention.

It will be recognized that the above described invention may be embodied in other specific forms without departing from the spirit or essential characteristics of the disclosure. For example, the up-scaling can be applied to add additional columns. Furthermore, any encoding algorithm that needs input buffers can be integrated with a scaling operation in accordance with the teaching of the present invention.

Thus, it is understood that the invention is not to be limited by the foregoing illustrative details, but rather is to be defined by the appended claims.

What is claimed is:

1. A method of scaling the data in a first predetermined format into data in a second predetermined format that is different from the first predetermined format in a system having a video compressor that includes an integrated scaling mechanism and a compression engine that accepts data in the second predetermined format, wherein the integrated scaling mechanism has a buffer and a plurality of storage locations arranged in rows and columns, comprising:
   a. providing the data in the first predetermined format to the scaling mechanism;
   b. scaling the data in the first predetermined format into data in the second predetermined format;
   c. providing the data in the second predetermined format directly to the compression engine;
   d. asserting an up-insert signal based on the first predetermined format, the second predetermined format, the current row, and a number of lines inserted previously; and
   e. based on the up-insert signal, selectively (1) enabling a current row for receiving data, or (2) simultaneously enabling the current row and a next row.

2. The method of claim 1, wherein the video compressor is coupled to a memory that stores data in a first predetermined format, wherein step (c) is performed without interaction with the memory.

3. The method of claim 1, further comprising:
   determining whether a next row crosses a boundary between a current block and a next block; and
   if no, simultaneously enabling the current row and the next row and writing data to the current row and the next row; and
   if yes, enabling the current row, writing data to the current row, and reading the previously read data and writing the previously read data into a first row of a next block.

4. The method of claim 1, further comprising determining if the up-insert signal is asserted, and if not asserted:
   enabling the current row; and
   writing data into the current row.

5. The method of claim 1, further comprising determining if the up-insert signal is asserted, and if asserted:
   simultaneously enabling the current row and the next row; and
   simultaneously writing data into the current row and the next row.

6. In a system having a memory for storing data in a first predetermined format, a video compressor coupled to the memory comprising:
   a. a compression engine for compressing data, the compression engine accepting data in a second predetermined format different from the first predetermined format;
   b. an address generator for generating addresses to access the memory for data in the first predetermined format; and
   c. an integrated scaling mechanism for scaling the data in the first predetermined format into data in the second predetermined format acceptable to the compression engine, said scaling mechanism having an input for receiving data in a first predetermined format and an output coupled to the compression engine for providing data in the second predetermined format, wherein the integrated scaling mechanism further includes:
      a buffer having a plurality of storage locations arranged in row and columns;
      a row-decoder for receiving a portion of an address and based thereon for selecting a row;
      a column-decoder for receiving a portion of the address and based thereon for selecting a column; and
      a multiplexer interposed between the row decoder and each row for selectively performing either one of (i) enabling a current row or (ii) simultaneously enabling a current row and a next row based on an up-insert signal.

7. The video compressor of claim 6, wherein the integrated scaling mechanism for scaling the data in the first predetermined format into data in the second predetermined format acceptable to the compression engine further includes
   a. a buffer having a plurality of cells arranged in row and columns;
   b. a row-decoder for receiving a portion of an address and based thereon for selecting a row;
   c. a column-decoder for receiving a portion of the address and based thereon for selecting a column;
   d. a multiplexer interposed between the column decoder and each column for selectively performing either one of (i) enabling a current column or (ii) simultaneously enabling a current column and a next column based on an up-insert signal.

8. The video compressor of claim 7, wherein the multiplexers further includes:
   a. a first multiplexer associated with the first column having a first input for receiving a first column X-enable signal, a select input for receiving the up-insert signal, and an output; and
   b. a plurality of second multiplexers, each associated with one of the other columns and having a first input for receiving an X-enable signal for the respective column, a second input for receiving an X-enable signal for an immediately preceding column, a select input for receiving the up-insert signal, and an output.

9. The video compressor of claim 6, wherein a same data can be written simultaneously to the current row and the next row when the current and next rows are simultaneously enabled.

10. The video compressor of claim 6, further including an accumulator coupled to the multiplexers for selectively asserting the up-insert signal.

11. The video compressor of claim 10, further including a counter that increments by two upon receipt of the up-insert signal, and by one when the up-insert signal is not asserted, the counter coupled to the address generator to provide notify the address generator that a block of data has been completed.

12. The video compressor of claim 11, wherein the accumulator further includes:
   an adder having a first input for receiving a differential value, a second input for receiving a DDA value, a first output for providing the carry out signal, and a second output for providing a sum of the inputs; and
   a flip-flop having a first input for receiving a reset signal, a second input for receivng a clock signal, a third input for receiving the second output of said adder, and an output for providing the DDA value.

13. The video compressor of claim 6, wherein the multiplexers further includes:
   a. a first multiplexer associated with the first row having a first input for receiving a first row Y-enable signal, a select input for receiving the up-insert signal, and an output; and
   b. a plurality of second multiplexers, each associated with one of the other rows and having a first input for receiving a Y-enable signal for the respective row, a second input for receiving a Y-enable signal for an immediately preceding row, a select input for receiving the up-insert signal, and an output.

14. The video compressor of claim 6, wherein the row-decoder and the column-decoder together specify one cell in the buffer.

\* \* \* \* \*